(12) United States Patent
Pietrowicz et al.

(10) Patent No.: US 11,319,162 B2
(45) Date of Patent: May 3, 2022

(54) METHOD FOR THE MANAGEMENT, IN FLOW MODE, A BUFFER STORAGE AND LOAD SEQUENCING SYSTEM, AND CORRESPONDING MANAGEMENT UNIT

(71) Applicant: SAVOYE, Dijon (FR)

(72) Inventors: Stephane Pietrowicz, Fixin (FR); Jean-Michel Collin, Merceuil (FR); Blandine Vacher, Neuilly le Real (FR)

(73) Assignee: SAVOYE, Dijon (FR)

( * ) Notice: Subject to any disclaimer, the term of this patent is extended or adjusted under 35 U.S.C. 154(b) by 272 days.

(21) Appl. No.: 16/667,108

(22) Filed: Oct. 29, 2019

(65) Prior Publication Data

US 2020/0130950 A1    Apr. 30, 2020

(30) Foreign Application Priority Data

Oct. 30, 2018   (FR) ..................................... 1860028

(51) Int. Cl.
  *B65G 43/10*   (2006.01)
  *G05B 15/02*   (2006.01)
(52) U.S. Cl.
  CPC ............. *B65G 43/10* (2013.01); *G05B 15/02* (2013.01)
(58) Field of Classification Search
  CPC combination set(s) only.
  See application file for complete search history.

(56) References Cited

U.S. PATENT DOCUMENTS

| 8,998,554 B2* | 4/2015 | Toebes | B65G 17/18 |
| | | | 414/331.04 |
| 10,322,880 B2* | 6/2019 | Collin | B65G 1/1378 |
| 2012/0101627 A1* | 4/2012 | Lert | B65G 1/065 |
| | | | 700/216 |

(Continued)

FOREIGN PATENT DOCUMENTS

FR    3051948 A1    12/2017

OTHER PUBLICATIONS

French Search Report and Written Opinion dated Jul. 4, 2019 for corresponding French Application No. 1860027, filed Oct. 30, 2018.

(Continued)

*Primary Examiner* — Kyle O Logan
(74) *Attorney, Agent, or Firm* — David D. Brush; Westman, Champlin & Koehler, P.A.

(57) ABSTRACT

A method for managing a buffer storage and load sequencing system. The system receives non-sequenced loads and provides at least one sequence of loads, and includes a buffer storage unit having entrance levels, at least one recirculation level, an entrance elevator facing entrances and an exit elevator facing exits of the levels. A management unit iteratively manages the entrance elevator. At each iteration the entrance elevator: has a "waiting for recirculation" status for a load to be recirculated in the system; holds this elevator until the load to be recirculated has been transferred to the recirculation level, else selects a load at exit from an entrance conveyor or at exit from the recirculation level; if the selection of the entrance level is completed, generates a task, for the entrance elevator, of transferring the selected load to the selected level; if not assigns this load the "awaiting recirculation" status.

11 Claims, 4 Drawing Sheets

(56) References Cited

U.S. PATENT DOCUMENTS

Figure 1:
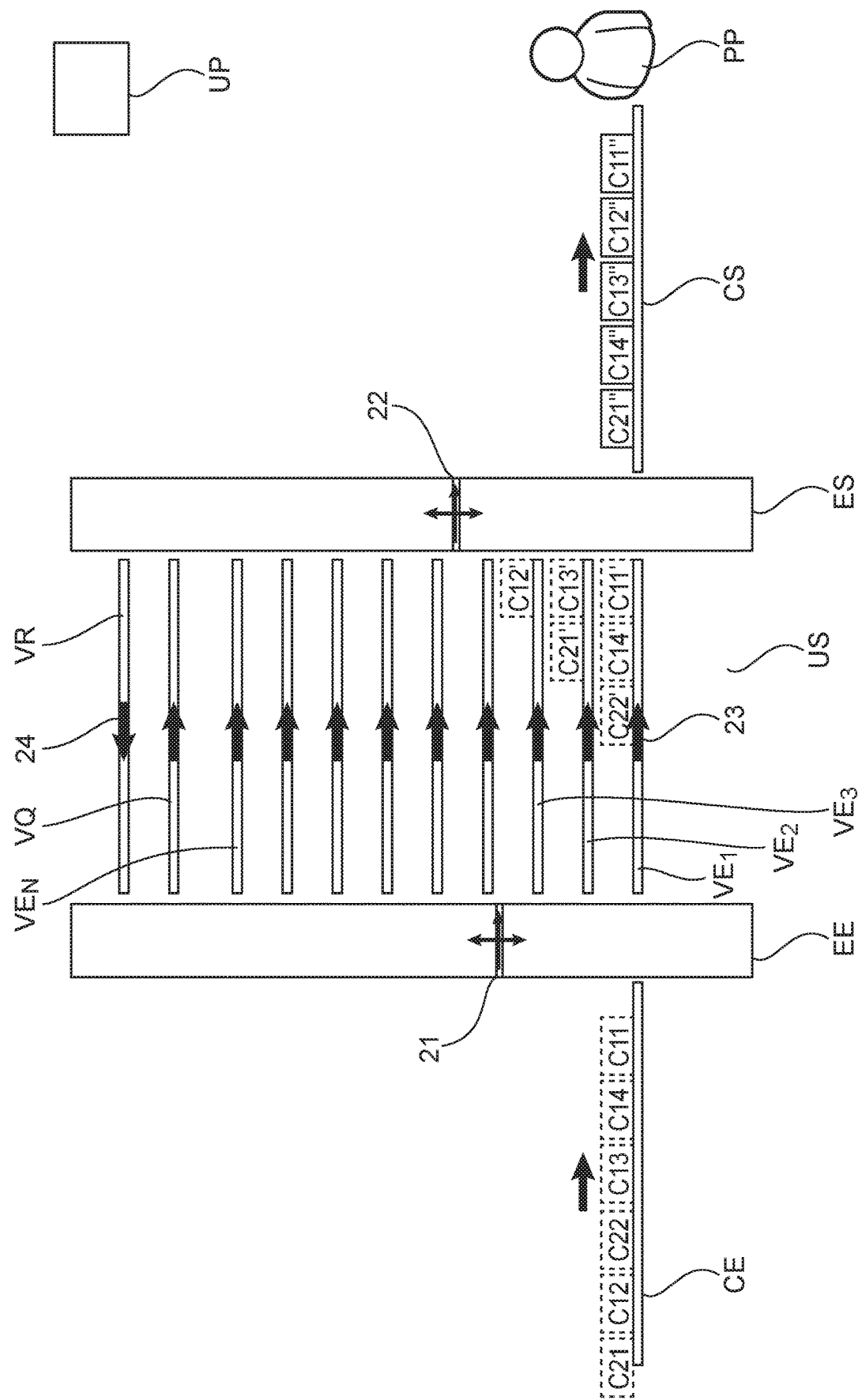

2012/0195720 A1* 8/2012 Sullivan .............. B65G 1/0492
414/277

OTHER PUBLICATIONS

English translation of the Written Opinion dated Jul. 4, 2019 for corresponding French Application No. 1860027, filed Oct. 30, 2018.
Robert Sedgewick, "Priorities Queues", Dec. 29, 2017 (Dec. 29, 2017), XP055601331.
French Search Report and Written Opinion dated Jul. 4, 2019 for corresponding French Application No. 1860028, filed Oct. 30, 2018.
English translation of the Written Opinion dated Jul. 4, 2019 for corresponding French Application No. 1860028, filed Oct. 30, 2018.
Notice of Allowance dated Jan. 24, 2022 from related U.S. Appl. No. 16/667,087, filed Oct. 29, 2019.

* cited by examiner

METHOD FOR THE MANAGEMENT, IN FLOW MODE, A BUFFER STORAGE AND LOAD SEQUENCING SYSTEM, AND CORRESPONDING MANAGEMENT UNIT

1. TECHNICAL FIELD

The field of the invention is that of logistics and systems of buffer storage and load sequencing (or buffer-sequencers), configured to receive non-sequenced loads coming from at least one external unit (for example an automated storage/removal warehouse) and to supply at least one sequence of loads in a given order to at least one picking/preparing station.

The present invention relates more precisely to the management of a buffer storage and load sequencing system when this system comprises:
- a buffer storage unit comprising a plurality of entrance levels and at least one vertically superimposed recirculation level, each having a single entrance and single exit and each comprising a "first-in-first-out" type conveyor in a first direction or sense for the entrance levels and a second sense opposite to the first sense for the at least one recirculation level, a load present on the at least one recirculation level being called a load in recirculation; and
- an entrance lift or elevator and an exit lift, of the reciprocating and discontinuous type, respectively positioned so as to be facing entrances and facing exits of the entrance levels and of the at least one recirculation level.

The present invention can be applied to any type of preparing station and especially but not exclusively to:
- stations for preparing customer orders (also called picking stations), by picking products from storage containers (also called source loads): an operator (or a robot) receives a pick list (on paper, on the screen of a terminal, in voice form, in the form of a data-processing task (in the case of a robot), etc.). For each pallet to be shipped (also called a "shipping container" or "target load"), this list informs the operator or robot about the quantity of each type of product that he or it must collect in storage containers and group together in the package to be shipped; and
- storage container palletizing stations (also called "source loads") themselves containing items: an operator (or a robot) receives a pick list (on paper, on a terminal screen, in voice form, in the form of data-processing tasks (when it is a robot), etc.) informing him or it that, for each pallet to be shipped (also called "a shipping container" or "target load"), the quantity of each type of storage container (for example cardboard packages) that it must collect and discharge on the pallet to be dispatched.

2. TECHNOLOGICAL BACKGROUND

The patent application FR3051948A1, filed by the holder of the present application (the firm SAVOYE), describes several possible implementations of a system for the buffer storage and sequencing of loads of the type mentioned here above, i.e. comprising a buffer storage unit itself comprising N entrance levels and at least one recirculation level, as well as an entrance elevator and an exit elevator.

The general principle of such a system consists in carrying out the functions of buffer storage and sequencing of loads by using two reciprocating elevators (entrance and exit respectively) in combination with a buffer storage unit under the control of a management unit configured to organize various movements of loads between these entities. The management unit UP especially ensures compliance with a rule according to which loads present on a same entrance level are sequenced in a rising order of sequential order numbers.

The sequencing (scheduling) capacity of the system is linked to the quantity of loads that can be temporarily stored in the buffer storage unit. By enabling recirculation (i.e. a return to the reciprocating entrance elevator, and therefore potentially towards the entrance of the buffer storage unit) of certain loads that exit the buffer storage unit, the (at least one) recirculation level prevents a situation of blockage of the buffer storage unit without increasing its number of entrance levels.

The term "external unit" (that gives the non-sequenced loads) is understood for example to mean (this list is not exhaustive): an automatic system (for example an automated storage/removal warehouse); a semi-automatic system; a manual system; another buffer storage and load sequencing system; a combination of at least two of the above systems; etc.

Such a system has numerous advantages, especially but not exclusively:
- minimizing (and even in certain cases totally eliminating) sequencing constraints at the exit from the external unit or units by a sequencing of the loads downstream to this unit or these units and as close as possible to the preparation station or stations; this minimizing (or elimination) of constraints reduces size and complexity and therefore the cost of the external unit or units;
- reducing the footprint;
- optimizing the efficiency of the total system (including especially the external unit or units, the buffer storage and sequencing system and the preparing station or stations);
- optimizing the reactivity of the overall system;
- manipulating multi-format loads if motor-driven rollers are used;
- optimizing costs if the general system comprises several preparation stations (pooling of the buffer storage and sequencing system);
- etc.

At exit from the buffer storage and sequencing system, several types of load sequences can be obtained, especially but not exclusively:
- a sequence comprising solely source loads, each source load being a storage container of an article or articles; or
- a sequence comprising only target loads, each target load being a shipping container of an article or articles; or
- a sequence comprising a target load, which is a shipping container of an article or articles, followed by at least one source load which is a storage container of an article or articles.

Several buffer storage and sequencing systems (each made according to the proposed solution) can be used in parallel. For example, upstream to the at least one preparing station, a first system is used solely for source loads and at the same time a second system is used solely for target loads.

The present inventors have thought it desirable to optimize the management of a buffer storage and load sequencing system as described in the patent application FR3051948A1.

They have identified several modes of optimization relating particularly to the control of the entrance elevator, including a search for a solution to the following problems while managing a compromise between, on the one hand, an increase in the flow rate of the sequenced loads exiting onto the exit conveyor and secondly a reduction of the risks of blockage of the system:
- selecting a load: how to choose between the loads that arrive at the entrance elevator via the entrance conveyor and the loads in recirculation that arrive at the entrance elevator via the recirculation level?
- selecting a destination level: once a load has been chosen how to choose, from among the entrance levels, that destination level to which the load must be transferred by the entrance elevator while ensuring compliance with the above-mentioned rule according to which the loads present at a same entrance level are sequenced in a rising order of sequential order numbers?
- selecting a level for loads to be recirculated: when it is not possible to choose a destination level while ensuring compliance with the above-mentioned rule, how to choose, among the entrance levels, a level for loads to be recirculated (i.e. a level at which the loads hosted by this level will have to be transferred by the exit elevator towards the recirculation level)?

The invention, in at least one embodiment, is aimed mainly at providing a method for the management of a buffer storage and load sequencing system offering a solution to the problems and issues mentioned here above (or at least one among them), while at the same time managing the above-mentioned compromise (between increasing exit flowrate of the sequenced loads and reducing risks of blockage of the system).

3. SUMMARY

One particular embodiment of the invention proposes a method for managing a buffer storage and load sequencing system, configured to receive non-sequenced loads coming from at least one external unit, via at least one entrance conveyor and provide at least one sequence of loads in a given sequential order to least one preparing station, through at least one exit conveyor, the system comprising:
- a buffer storage unit comprising N entrance levels and at least one recirculation level which are vertically superimposed, each having a single entrance and a single exit and each comprising a "first-in-first-out" type conveyor in a first sense for the entrance levels and in a second sense opposite the first sense for the at least one recirculation level, with N≥2, a load present on the at least one recirculation level being called a load in recirculation; and
- an entrance elevator and an exit elevator, of the reciprocating and discontinuous type, respectively positioned so as to be facing entrances and facing exits of the N entrance levels and of the at least one recirculation level.

A managing unit carries out an iterative management of the entrance elevator comprising, at each iteration, the following steps:
- if the entrance elevator is assigned a "waiting for recirculation" status, meaning that there is at least one load to be recirculated in the system, the entrance elevator is put on hold until said at least one load to be recirculated has been transferred to the entrance of the at least one recirculation level;
- if the entrance elevator is not assigned said "waiting for recirculation" status:
    - detecting a first load at an exit of the entrance conveyor and a second load at the exit of the at least one recirculation level;
    - selecting a load with the following rules: selecting the first load if there is no second load present or vice versa; if the first and second loads are present, selecting either routinely the second load or the load having the smallest sequential order number;
    - selecting a destination level from among the entrance levels in complying with a rule according to which loads present on a same entrance level, except for loads to be recirculated if any, are sequenced in a rising order of sequential order numbers;
    - if the selection of a destination level is completed, generating a task, for the entrance elevator, of transferring the selected load to the entrance of the selected destination level; if not:
        - assigning, to the entrance elevator, said "waiting for recirculation" status; and
        - selecting a level to be recirculated from among the entrance levels, without generating a task, for the entrance level, of transferring the selected load to the entrance of the selected level of loads to be recirculated, and assigning each load of the level of loads to be recirculated a status of a load to be recirculated signifying that said load must be transferred by the exit elevator to the entrance of the at least one recirculation level.

The general principle of the proposed solution consists in carrying out an iterative management of the entrance elevator in which, in order to promote the increase in the exit flowrate of sequenced loads relative to the reduction of risks of blockage (in the management of the above-mentioned compromise):
- it is not sought to generate a transfer task for the entrance elevator so long as there is at least one load to be recirculated in the system; and
- in the selection of loads at the entrance of the entrance elevator, if two loads arrive at the same time, one on the entrance conveyor and the other on the recirculation level, two implementations are proposed (in the first, it is still the load awaiting recirculation that is chosen; in the second, that load of the two loads having the smallest sequential order number is chosen).

Besides, the selection of a level of loads to be recirculated (in a given iteration of the iterative management) is associated with the assigning of the "to be recirculated" status to each load of the level of loads to be recirculated, but does not imply the generation, for the entrance level, of a task of transferring the selected load to the entrance of the selected level of loads to be recirculated. Thus, the following iteration of the iterative management is used to generate such a transfer mission, and this optimizes the choice of the entrance level on which the next selected load will be placed.

Here below, referring to the figures, we describe various characteristics of the process of selecting a destination level and the process of selecting a level of loads to be recirculated, further increasing the exit flow rate of the sequenced loads.

Various implementations and characteristics of the proposed method of management are specified in the set of claims. They are also described in detail (with their associated advantages) and illustrated through examples given here below in the description.

Another embodiment of the invention proposes a computer program product comprising program code instructions for the implementing of the above-mentioned method (in any one of its different embodiments) when said program is executed on a computer.

Another embodiment of the invention proposes a computer-readable and non-transient storage medium storing a computer program comprising a set of instructions executable by a computer to implement the above-mentioned method (in any one of its different embodiments).

Another embodiment of the invention proposes a unit for the management of a buffer storage and load sequencing system configured to receive non-sequenced loads coming from at least one external unit, via at least one entrance conveyor and to provide at least one sequence of loads in a desired order to least one preparing station, through at least one exit conveyor, the system comprising:
  a buffer storage unit comprising N entrance levels and at least one recirculation level which are vertically superimposed, each having a single entrance and a single exit and each comprising a "first-in-first-out" type conveyor in a first sense for the entrance levels and in a second sense opposite the first sense for the at least one recirculation level, with N≥2, a load present on the at least one recirculation level being called a load in recirculation; and
  an entrance elevator and an exit elevator, of the reciprocating and discontinuous type, respectively positioned so as to be facing entrances and facing exits of the N entrance levels and of the at least one recirculation level.

Said unit of management is configured to carry out an iterative management of the entrance elevator, according to any one of its embodiments described further below.

4. LIST OF FIGURES

Figure 2:
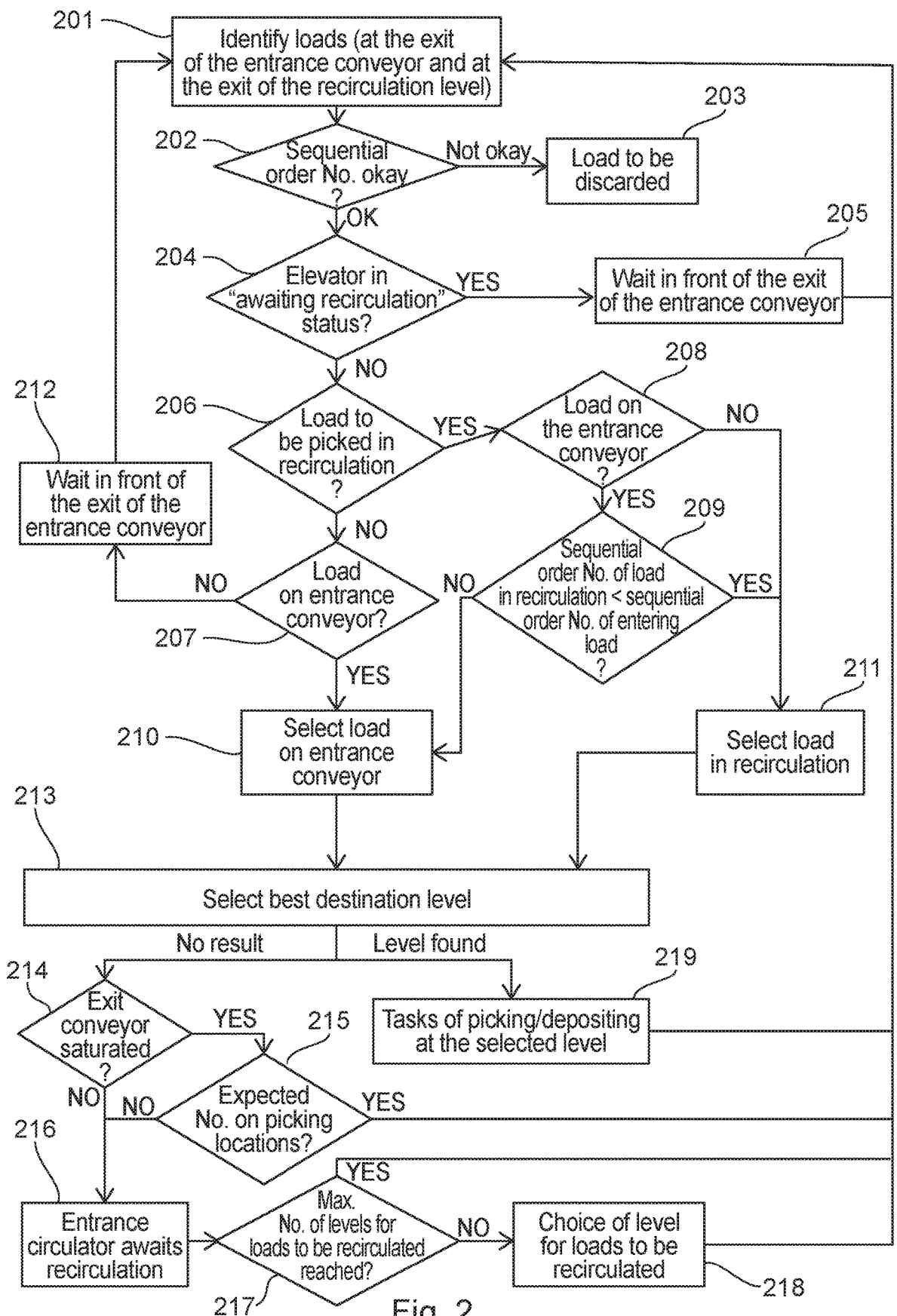
Figure 3:
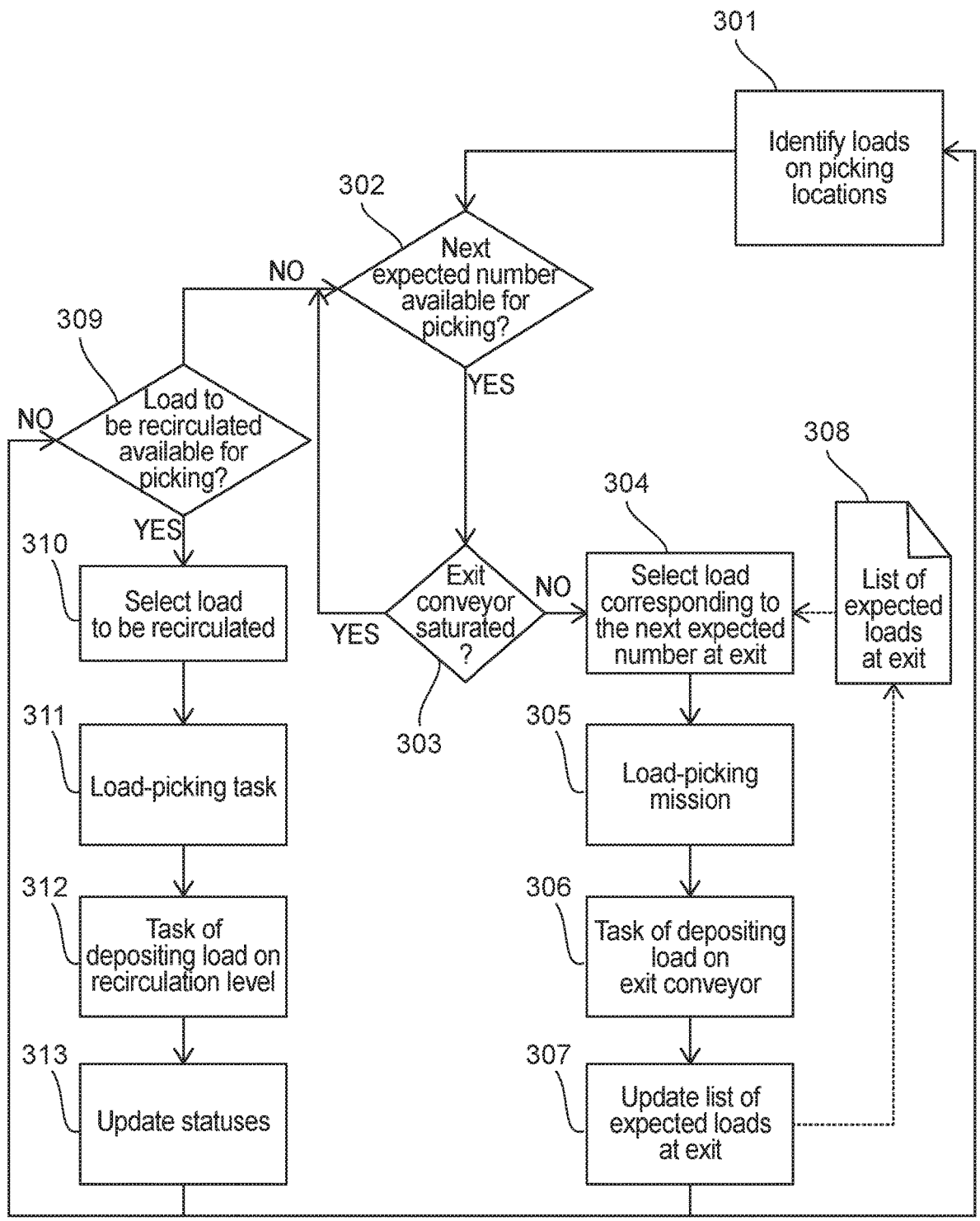
Figure 4:
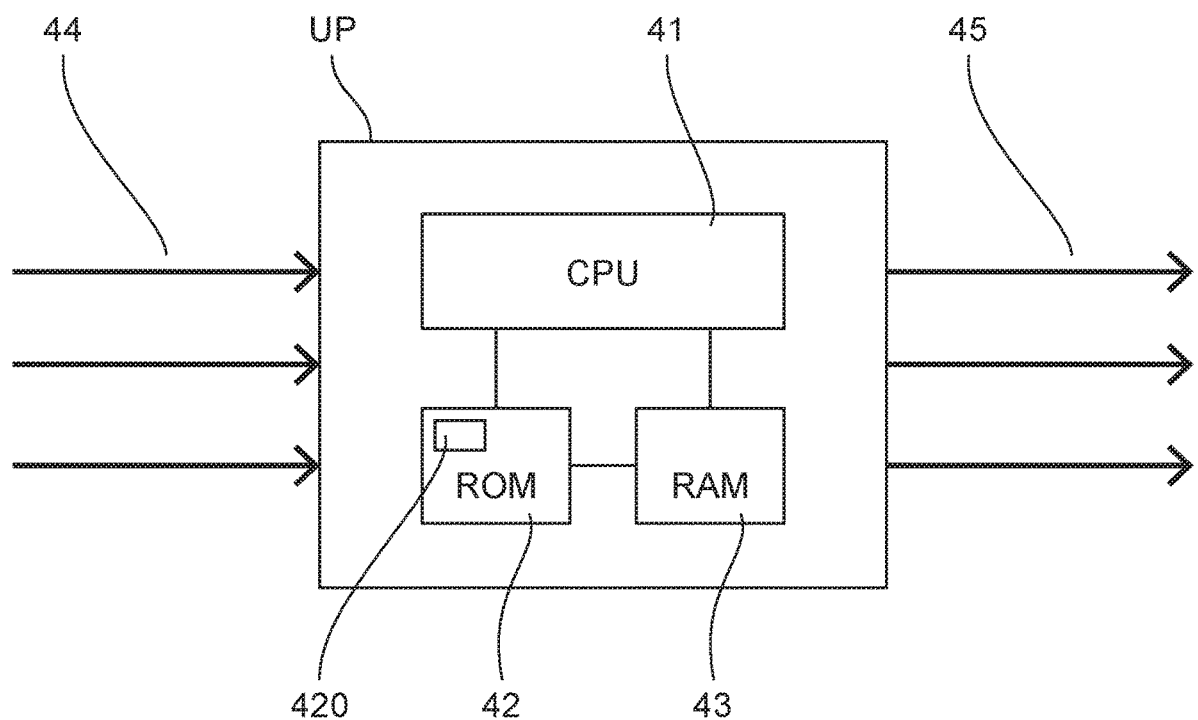

Other features and advantages of the invention shall appear from the following description given by way of an indicative and non-exhaustive example and from the appended drawings, of which:
  FIG. 1 is a side view of a buffer storage and load sequencing system according to one particular embodiment of the invention;
  FIG. 2 is a flowchart of the management of the entrance elevator according to one particular embodiment of the invention;
  FIG. 3 is a flowchart of the management of the exit elevator according to one particular embodiment of the invention; and
  FIG. 4 is a block diagram of a management unit according to one particular embodiment of the invention.

5. DETAILED DESCRIPTION

In all the figures of the present document, the identical elements and steps are designated by a same numerical reference.

FIG. 1 illustrates a buffer storage and load sequencing system according to one particular embodiment of the invention. It is configured to receive non-sequenced loads coming from an external unit (not shown), through an entrance conveyor CE and to give at least one sequence of loads in a given sequential order (sequenced loads) to a preparation station (also called "picking station") PP (occupied by an operator or a robot), via an exit conveyor CS.

In other words, the system (or buffer sequencer) sorts out the loads as a function of a list of loads awaited (or expected) at exit and of loads that it discovers at entrance.

The list of loads awaited at exit is given by the management unit UP. It comprises pairs associating a sequential order number and a load identifier. The list of loads awaited at exit therefore gives a list of sequential order numbers which is obligatorily a rising order that is not strict (but not necessarily continuous). Examples of lists of sequential order numbers:
  example 1: 1, 2, 3, 4, 5, 6, 7, 8;
  example 2: 1, 1, 2, 3, 4, 4, 4, 4, 5, 6, 7, 8, 8, 9, 9, 10;
  example 3: 1, 1, 2, 3, 6, 7, 8, 8, 10.

The next number on the list of loads awaited at exit is the first on the list, which therefore has the lowest value.

When a load has been processed (deposited on the exit conveyor), its sequential order number is removed from the list. The preceding examples of sequential order number lists are updated, assuming that a load having a sequential order number 1 has been deposited on the exit conveyor:
  example 1: 2, 3, 4, 5, 6, 7, 8;
  example 2: 1, 2, 3, 4, 4, 4, 4, 5, 6, 7, 8, 8, 9, 9, 10;
  example 3: 1, 2, 3, 6, 7, 8, 8, 10.

The external unit is for example an automated storage/removal warehouse. In one variant, the external unit is another buffer storage and load sequencing system. In another variant, the buffer storage and load sequencing system receives non-sequenced loads coming from several external units (either via several entrance conveyors CE each specific to one of the external units or via an entrance conveyor CE used jointly by several external units).

The buffer storage and load sequencing system comprises an entrance elevator EE, an exit elevator ES, a buffer storage unit US and a management unit UP.

The entrance elevator EE and exit elevator ES are vertical reciprocating and discontinuous elevators each comprising a single nacelle 21, 22 carrying out alternating or reciprocating vertical movements (the nacelle rises and descends in alternation). By opposition, a "continuous elevator" (also called a "paternoster") is a vertical elevator comprising a plurality of nacelles circulating in a closed loop, without alternating movement. The single nacelle 21, 22 is a one-load unit (it comprises a single level comprising a single location configured to receive one load). Thus, the elevators EE, ES are simple, low-cost units.

The single nacelle location is for example equipped with a motor-driven conveyor section (or any other transfer device) enabling the transfer of a load on to or out of the nacelle. In one variant, the nacelle location is equipped with idlers or idle rollers put into motion for example by a collapsible mechanical means positioned at the end of another piece of equipment (a conveyor or buffer location). Other means of putting the system into movement can be envisaged.

In another variant, the single nacelle of each elevator EE, ES is a multi-load unit (it comprises several levels and/or several load locations per level).

In another variant, the elevators EE, ES are reciprocating and discontinuous type vertical elevators, each comprising several nacelles each carrying out alternating vertical movements (the nacelle rises and descends in alternation). Each nacelle comprises one or more levels and/or one or more load locations per level.

The buffer storage unit US comprises:
  N entrance levels $VE_1$ to $VE_N$, vertically superimposed, each having a single entrance and a single exit and each comprising a "first-in-first-out" or FIFO type conveyor in a first sense (indicated in FIG. 1 by black arrows oriented from left to right, especially the arrow referenced 23), with N≥2 (for example, N=9 in one particular implementation). Each entrance level automatically moves the loads from upstream (entrance elevator side) to downstream (exit elevator side). Each entrance level comprises an automatic step-by-step forward feed conveyor, so as to automatically move the loads forward up to a waiting position before the loads are picked by the exit elevator. They can thus be a maximum of Y loads in one level;

a recirculation level VR, vertically superimposed with the entrance levels, having a single entrance and a single exit and comprising a "first-in-first-out" type conveyor in a second sense (indicated in FIG. 1 by a black arrow oriented from right to left and referenced 24) opposite the first sense. Each load present on the recirculation level VR is called a "recirculation load". The recirculation level automatically shifts the loads from downstream (on the exit elevator side) to upstream (entrance elevator side). The recirculation level VR can be positioned at any stage whatsoever (in one particular embodiment, it is positioned vertically to the center of the superimposition of the entrance levels, in order to limit the movements of the exit elevator). In one variant, the buffer storage unit US comprises several recirculation levels;

(optionally) one "fast track" level VQ vertically superimposed with the entrance levels $VE_1$ to $VE_N$ and the recirculation level VR, having a single entrance and a single exit, and comprising a "first-in-first-out" type conveyor according to the first sense. The fast track level is reserved for delayed loads to enable them to be picked as fast as possible by the exit elevator.

The entrance elevator EE and the exit elevator ES are positioned respectively at the entrance and at the exit of the N entrance levels $VE_1$ to $VE_N$ of the recirculation level VR and of the "fast track" level VQ of the buffer storage unit US. The nacelle 21 of the entrance elevator EE can come into a position facing the entrance of each of the N entrance levels and of the "fast track" level VQ of the buffer storage unit US to insert a load therein. It can also come to a position facing the exit of the recirculation level VR to remove a load therefrom.

The nacelle 22 of the exit elevator ES can come into positions each facing the exit of one of the N entrance levels and the "fast track" level VQ of the buffer storage unit US to remove a load therefrom. It can also come into a position facing the entrance of the recirculation level VR to insert a load thereon.

The entrance conveyor CE occupies a position enabling direct exchange of loads with the entrance elevator EE. In other words, a load can pass directly from one to the other. In the example of FIG. 1, the entrance elevator EE is positioned between the entrance conveyor CE and the buffer storage unit US, and the entrance conveyor CE is vertically aligned with the entrance level referenced $VE_1$ of the buffer storage unit US. In variants, the entrance conveyor CE can occupy other vertical positions, and can especially be aligned vertically with any one of the N entrance levels $VE_1$ to $VE_N$ of the buffer storage unit US, or with the "fast track" level VQ or the recirculation level VR. In other variants, the entrance conveyor CE and the buffer storage unit US are positioned on the same side of the entrance elevator EE (in this case, the entrance conveyor CE is positioned above or beneath the buffer storage unit US). In other variants, it is possible to have several entrance conveyors CE in accordance with all the previous variants.

The exit conveyor CS occupies a position enabling direct exchange of loads with the exit elevator EE. In other words, a load can pass directly from one to the other. In the example of FIG. 1, the exit elevator ES is positioned between the buffer storage unit US and the exit conveyor CS, and the exit conveyor CS is vertically aligned with the entrance level referenced $VE_1$ of the buffer storage unit US. In variants, the exit conveyor CS can occupy other vertical positions, and can especially be aligned vertically with any one of the N entrance levels $VE_1$ to $VE_N$ of the buffer storage unit US, or with the "fast track" level VQ or the recirculation level VR. In other variants, the exit conveyor CS and the buffer storage unit US are positioned on the same side of the exit elevator ES (in this case, the exit conveyor CS is positioned above or beneath the buffer storage unit US). In other variants, it is possible to have several exit conveyors CS in accordance with all the previous variants.

The management unit UP enables the optimal organization of the movements of the loads in the system, and especially on the entrance elevator EE and exit elevator ES and the buffer storage unit US in order to make source loads available on the exit conveyor CS according to at least one determined sequence (comprising loads in a desired sequential order). To this end, the management unit UP receives information (in particular a load identifier) on the loads passing through different places of the system, read by reader devices (not shown) such as a barcode reader, RFID label reader, etc. These places are for example situated at the extremities of the different conveyors.

More specifically, the management unit UP organizes, under the above-mentioned constraint related to the delivery of at least one determined sequence, different movements of loads:

from the entrance conveyor CE to the entrance elevator EE;

from the entrance elevator EE to the N entrance levels of the buffer storage unit US;

from the entrance elevator EE to the "fast track" level VQ of the buffer storage unit US;

from the N entrance levels of the buffer storage unit US to the exit elevator ES;

from the "fast track" level VQ of the buffer storage unit US to the exit elevator ES;

from the exit elevator ES to the exit conveyor CS;

from the exit elevator ES to the recirculation level VR; and from the recirculation level VR to the entrance elevator EE.

The entrance elevator EE and the exit elevator ES work simultaneously, thus increasing the rate of the buffer storage and sequencing unit.

For the system to provide a sequence of loads in a given sequential order, the management unit UP performs:

an iterative management of the entrance elevator (see FIG. 2) so that it carries out a pre-sequencing when it places loads of the sequence at the entrance to the entrance levels $VE_1$ to $VE_N$ and the "fast track" level VQ of the buffer storage unit US. To this end, the management unit UP ensures especially compliance with a rule according to which the loads present on a same entrance level (apart from a load or loads to be recirculated, if any) are sequenced in a rising order of sequential order numbers. In other words, on each of the N entrance levels, a given load having a given rank within the sequence should not be preceded by any other load (apart from loads to be recirculated if any) of a rank strictly higher than the given rank (several loads can receive the same rank within the sequence); and an iterative management of the exit elevator (see FIG. 3), so that it carries out a final sequencing when it picks loads of the sequence at exit from the N entrance levels $VE_1$ to $VE_N$ and from the "fast track" level VQ of the buffer storage unit US according to the given sequential order.

In other words, the sequencing function (scheduling function) is distributed between the entrance elevator EE (which carries out the pre-sequencing) and the exit elevator ES (which carries out the final sequencing). This enables the buffer storage and load sequencing system to work at a high rate (directly related to the working rate of the entrance and exit elevators).

Thus, in the example illustrated in FIG. 1, the sequence to be reconstituted on the exit conveyor CS is considered to comprise the following ordered loads: C11, C12, C13, C14 and C21. The entrance elevator EE receives the loads unordered (C11, C14, C13, C22, C12 and C21). It carries out a pre-sequencing in carrying out the following successive actions:
  placing the load C11 on the entrance level $VE_1$;
  placing the load C14 on the entrance level $VE_1$;
  placing the load C13 on the entrance level $VE_2$ (it is not possible to place it on the entrance level $VE_1$ because the load C14 is already thereon);
  placing the load C22 on the entrance level $VE_1$;
  placing the load C12 on the entrance level $VE_3$ (it is not possible to place it on the entrance level $VE_1$ because the loads C14 and C22 are already thereon, nor is it possible to place it on the entrance level $VE_2$ because the load C13 is already thereon);
  placing the load C21 on the entrance level $VE_2$ (it is not possible to place it on the entrance level $VE_1$ because the load C22 is already thereon).

In FIG. 1, loads are referenced with alphanumeric characters (C22, C12, C13, etc.) to illustrate the working of the system. In order to show successive positions of a same load on the same figure, the following notation is used: for a first position, the load is referenced only with its associated alphanumeric characters (for example C11), for a second position, the reference of the load is complemented by the prime symbol (for example, C11'). For a third position, the load is referenced with the double prime symbol (for example, C11"), etc.

If it should be impossible for the entrance elevator EE to deposit a load on an entrance level, the management unit UP searches for and selects a level of loads to be recirculated among the entrance levels (in other words, one of the entrance levels is selected, and the selected entrance level is called "level of loads to be recirculated"). The selected entrance level then has the "to be recirculated" status, and the loads on this level have the "to be recirculated" status. A load "to be recirculated" passes to the "in recirculation" status when it is deposited on the recirculation level VR by the exit elevator ES. The maximum number of entrance levels that can have the "to be recirculated" status simultaneously is predefined. In one particular embodiment, this maximum number is equal to 1 in order to increase the outgoing flowrate of the sequenced loads.

In one particular embodiment, a discard path or track is installed, either at the entrance or at the exit of the buffer storage unit US in order to process anomalies, also called "discarded loads": unawaited loads, non-read loads, etc. The discarded loads are therefore either directly sent out by the entrance elevator or conveyed on an entrance level to be discharged by the exit elevator. A discarded load cannot take the "to be recirculated" status.

FIG. 2 presents a flowchart for the management of the entrance elevator by the management unit UP according to one particular embodiment of the invention. This is an iterative management comprising, at each iteration, the steps described in detail here below.

Except for the saturations of levels, the loads having the "discard" status are not taken into account. For example, if a "discarded" load is the load most upstream to a level (i.e. closest to the entrance level), it is the sequential order number of the load that precedes it (immediately downstream) that will be taken into account to define NumDerCharge".

In an initial step 201, the management unit detects and identifies the loads that may be present on the picking positions of the entrance elevator: picking position at the exit of the entrance conveyor CE and picking position at the exit of the recirculation level VR.

In a test step 202, the management unit retrieves the sequential order number of the loads detected and identified at the step 201 and ascertains that they are truly present in the list of loads awaited at exit. If the sequential order number of a detected load is not in the list of loads awaited at exit, the load is discarded in a step 203. If not, the operation passes to the test step 204 in which the management unit verifies whether the entrance elevator is assigned an "awaiting recirculation" status, signifying that there is at least one load to be recirculated in the system.

In the event of a positive response at the test step 204, the management unit passes to the step 205 in which the entrance elevator is put on hold (for example in front of the exit of the entrance conveyor) until the load or loads to be recirculated have been transferred to the entrance of the recirculation level, and then return to the initial step 201.

In the event of a negative response at the test step 204 (i.e. if the entrance elevator is not assigned the "awaiting recirculation" status), the management unit passes to the test step 206 (load present on the exit of the entrance conveyor?), combined with one of the identical test steps 205 and 208 (load present at the exit of the recirculation level?) to determine the case in which the system is situated, among four possible cases:
  case 1: no load present either on the exit of the entrance conveyor or on the exit of the recirculation level (negative responses to the tests 206 and 207);
  case 2: load present on the exit of the entrance conveyor and no load present on the exit of the recirculation level (positive response to the test 207 and negative response to the test 206);
  case 3: no load present on the exit of the entrance conveyor and load present on the exit of the recirculation level (negative response to the test 208 and positive response to the test 206);
  case 4: load present on the exit of the entrance conveyor and load present on the exit of the recirculation level (positive response to the test 206 and 208).

In the case 1, the management unit passes to the step 212 (identical to the step 205) in which the entrance elevator is kept waiting (for example in front of the exit of the entrance conveyor), then returns to the initial step 201.

In the case 2, the management unit passes to the step 210 in which the load present at the exit of the entrance conveyor is selected and then to the step 211 for selecting a destination level among the entrance levels.

In the case 3, the management unit passes to the step 211, in which the load present on the exit of the recirculation level is selected, and then to the step 213 for selecting a destination level among the entrance levels.

In the case 4:
  first implementation: the management unit passes directly to the step 211 in which the load present at the exit of the recirculation level is selected (no step 209)
  second implementation: the management unit passes to the test step 209 in which it detects whether the sequential order number of the load present at the exit of the recirculation level is smaller than the sequential order number of the load present at the exit of the entrance conveyor.

In the event of a positive response at the test step 209, the management unit passes to the step 211 (in which the load present at the exit of the recirculation level is selected) then to the step 213 (for selecting a destination level among the entrance levels). If not (negative response at the test step 209), it passes to the step 210 (in which the load present at the exit of the entrance conveyor is selected) then the step 213 (for selecting a destination level among the entrance levels). In short, in the case 4, the selected load is the one having the smallest sequential order number.

At the step 213, the management unit tries to select a destination level among the entrance levels, in complying with the above-mentioned rule according to which loads present on a same entrance level (apart from any load or loads to be recirculated) are sequenced in a rising order of sequential order numbers.

If the "fast track" level VQ is implemented, the management unit selects it directly if one of the following conditions is met:
  the sequential order number of the selected load is that of the next sequential number of the lists of loads awaited at output;
  the sequential order number of the selected load is the one directly awaited after the sequential order number of the last load placed on the "fast track" level (i.e. the one closest to the entrance elevator).

In one particular embodiment, the step 213 for selecting a destination level furthermore comprises the assigning of a note or grade to each of the entrance levels (with a set of grading rules described in detail here below) and then the selection of the entrance level that has obtained the highest (positive) grade.

In the event of equality between several entrance levels having the same grade, the management unit gives preference for example to the first entrance level, in following an order of scanning of the entrance levels, defined in a setting of parameters that depends on the physical configuration of the system.

In one particular implementation, the set of grading rules comprises the following steps for assigning a grade to a given entrance level:
  initializing the grade at zero;
  if the given entrance level is saturated, decrementing the grade by a value C0
  if the given entrance level is vacant, incrementing the grade by a value C1;
  if the sequential order number of the last load that has entered at the given entrance level is smaller than or equal to the sequential order number of the selected load, incrementing the grade by a value C2;
with: C1<C2<C0.

In one particular implementation, we have:

$$C2 = C3 - (\text{NumCharge} - \text{NumDerCharge}),$$

with NumDerCharge the sequential order number of the last load placed on the given entrance level and NumCharge the sequential order number of the selected load and with C1<C3<C0.

In one particular implementation, we have: C0=10000; C1=10; C2=200-(NumCharge-NumDerCharge).

In one particular implementation of the step 213, the selected destination level takes the status of a level to be recirculated and the selected load (which at the step 219 will be deposited on the selected destination level) takes the status of a load to be recirculated (in order to be transferred to the entrance of at the least one recirculation level by the exit elevator) if the following conditions are verified:
  the selected destination level is vacant;
  the sequential order number of the selected load is strictly greater than the sequential order number of the load in $(N.Y)^{th}$ place in the list of loads awaited at output with Y being the capacity of the loads of each entrance level; and
  either the recirculation is vacant or the last load placed on the recirculation level has a sequential order number smaller than the sequential order number of the selected load.

If the step 213 has been completed (i.e. if the destination level has been selected from among the entrance levels), the management unit carries out the step 219 in which it generates a task, for the entrance elevator, of transferring the selected load to the entrance of the selected destination level.

If the step 213 has not been completed, the management unit carries out test steps 214 and 215. In the step 214, it detects whether the at least one exit conveyor (CS) is saturated. At the step 215, it detects whether an exit elevator picking position is occupied by a load possessing the next sequential order number in the list of loads awaited at exit. If the two conditions of the tests 214 and 215 are verified, then the management unit returns to the initial step 201, and if not it goes to a test step 216 for assigning the "awaiting recirculation" status to the entrance elevator, and then to a test step 217 in which it detects whether the predetermined maximum number of level(s) of loads to be recirculated has been attained. As mentioned further above, in one particular embodiment, this maximum number is equal to 1, in order to increase the exit flowrate of the sequenced loads.

If the condition of the test 217 is verified, the management unit returns to the initial step 201. Else it goes to a step 218 for selecting a level of loads to be recirculated.

In the step 218, the management unit selects a level of loads to be recirculated from among the entrance levels (without the generation of a task, for the entrance elevator, of transferring the selected load to the entrance of the selected level of loads to be recirculated) and it assigns each load of the level of loads to be recirculated (except for the loads having the "discard" status) a status of a load to be recirculated (signifying that the load must be transferred by the exit elevator to the entrance of the recirculation level).

In one particular embodiment, the step 218 for selecting a level to be recirculated comprises:
  for each of the entrance levels, identification of the sequential order number of the load closest to the exit elevator; and
  selection, as the level to be recirculated, of the entrance level for which the identified order number is the highest FIG. 3 is a flowchart of the managing of the exit elevator by the management unit UP according to one particular embodiment of the invention. It is an iterative management operation comprising, at each iteration, the steps described in detail here below.

In an initial step 301, the management unit detects and identifies the loads, if any, present on the exit elevator picking position: picking positions at the exits of the entrance levels $VE_1$ to $VE_N$ and at the exit of the "fast track" level VQ.

In a test step 302, the management unit detects whether a load having the next sequential order number of the list of loads awaited at exit is available for picking, among the loads detected at the step 301.

In the event of a positive response at the test step 302, the management unit passes to the test step 303 in which it detects whether the exit conveyor is saturated.

In the event of a negative response at the test step 303, the management unit carries out the steps 304 to 307:
- in the step 304, the management unit selects a load having the next sequential order number of the list of loads awaited at the exit 308 (if there are several loads possessing a sequential order number of this kind, the management unit selects for example the load that is closest to the position of the exit elevator);
- in the step 305, the management unit generates a task, for the exit elevator, of picking the selected load;
- at the step 306, the management unit generates, for the exit elevator, a task of depositing the selected load on the exit conveyor CS;
- at the step 307, the management unit updates the list of loads awaited at the exit 308.

In the event of a negative response at the test step 302, or a positive response at the test step 303, the management unit carries out a test step 309 in which it verifies whether a load to be recirculated is available for picking, from among the loads detected at the step 301.

In the event of a positive response at the test step 309, the management unit performs the steps 310 to 313:
- at the step 310, the management unit selects a load to be recirculated (if there are several of them, the management unit selects for example the load that has the lowest sequential order number);
- at the step 311, the management unit generates, for the exit elevator, a task of picking the selected load to be recirculated;
- at the step 312, the management unit generates, for the exit elevator, a task of depositing the selected load to be recirculated on the recirculation level VR;
- at the step 313, the management unit updates the statuses. It removes the "to be recirculated" status from the load and assigns it the "in recirculation" status. If, following this change in status of the load, the entrance level at which it is situated no longer has any more loads "to be recirculated", the management unit removes the "to be recirculated" status from this entrance level.

In the event of a positive response at the test step 309, the management unit returns to the initial step 301.

FIG. 4 presents an example of a structure of the above-mentioned management unit UP, according to one particular embodiment of the invention. The management unit UP comprises a random-access memory 43 (for example a RAM), a processing unit 41 equipped for example with a processor and managed by a computer program 420 stored in a read-only memory 42 (for example a ROM or a hard disk drive). At initialization, the code instructions of the computer program 420 are for example loaded into the random-access memory 43 and then executed by the processor of the processing unit 41. The processing unit 41 inputs signals 44, processes them and generates output signals 45.

The input signals 44 include various pieces of information on the working of the general system (including among others the external unit or units, the buffer storage and sequencing system and the preparing station or stations), especially the load identifiers read (by reading devices such as barcode readers, RFID label readers, etc.) on the loads when they pass through different places of the general system (for example at the extremities of the different conveyors).

The output signals 45 include various pieces of control information for the management (controlling) of the apparatuses of the general system (especially within the buffer storage and sequencing system) in order to manage the movements of loads in the general system.

This FIG. 4 illustrates only one particular implementation among several possible implementations. Indeed, the management unit UP can be made equally well on a reprogrammable computing machine (a PC computer, a DSP processor or a microcontroller) executing a program comprising a sequence of instructions and/or on a dedicated computing machine (for example a set of logic gates such as an FPGA or an ASIC or any other hardware module). Should the management unit be implanted at least on partly on a reprogrammable computation machine, the corresponding program (i.e. the sequence of instructions) can be stored in a storage medium that is detachable (such as for example a floppy disk, a CD ROM or a DVD ROM) or not detachable, this storage medium being partially or totally readable by a computer or a processor.

The invention claimed is:

1. A method comprising:
   managing, by a managing unit, a buffer storage and load sequencing system, the system being configured to receive non-sequenced loads coming from at least one external unit, via at least one entrance conveyor, and to provide at least one sequence of loads in a given sequential order to at least one preparing station, through at least one exit conveyor, the system comprising:
   a buffer storage unit comprising N entrance levels and at least one recirculation level which are vertically superimposed, each having a single entrance and a single exit and each comprising a "first-in-first-out" type conveyor in a first sense for the entrance levels and in a second sense opposite the first sense for the at least one recirculation level, with $N \geq 2$, a load present on the at least one recirculation level being called a load in recirculation; and
   an entrance elevator and an exit elevator, of the reciprocating and discontinuous type, respectively positioned so as to be facing entrances and facing exits of the N entrance levels and of the at least one recirculation level;
   wherein the managing comprises the management unit carrying out an iterative management of the entrance elevator comprising, at each iteration, the following acts:
   if the entrance elevator is assigned a "waiting for recirculation" status, signifying that there exists at least one load to be recirculated in the system, the entrance elevator is put on hold until said at least one load to be recirculated has been transferred to the entrance of the at least one recirculation level;

if the entrance elevator is not assigned said "waiting for recirculation" status:
  detecting a first load at an exit of the entrance conveyor and a second load at the exit of the at least one recirculation level;
  selecting a load with the following rules: selecting the first load if there is no second load present or vice versa; if the first and second loads are present, selecting either routinely the second load or the load having the smallest sequential order number;
  selecting a destination level from among the entrance levels in complying with a rule according to which loads present on a same entrance level, except for loads to be recirculated if any, are sequenced in a rising order of sequential order numbers;
  if the selection of a destination level is completed, generating a task, for the entrance elevator, of transferring the selected load to the entrance of the selected destination level; if not:
    assigning, to the entrance elevator, said "waiting for recirculation" status; and
    selecting a level of loads to be recirculated from among the entrance levels, without generating a task, for the entrance level, of transferring the selected load to the entrance of the selected level of loads to be recirculated, and assigning each load of the level of loads to be recirculated a status of a load to be recirculated signifying that said load must be transferred by the exit elevator to the entrance of the at least one recirculation level.

2. The method according to claim 1, wherein the act of selecting a destination level comprises:
  assigning a grade to each of the entrance levels with a set of grading rules; and
  selecting the entrance level having the highest grade;
and wherein the set of grading rules comprises the following acts for assigning a grade to a given entrance level:
  resetting the grade at zero;
  if the given entrance level is saturated, decrementing the grade by a value C0;
  if the given entrance level is vacant, incrementing the grade by a value C1;
  if the sequential order number of the last load entered in the given entrance level is smaller than or equal to the sequential order number of the selected load, incrementing the grade by a value C2;
  with: C1<C2<C0.

3. The method according to claim 2, wherein:

$$C2=C3-(NumCharge-NumDerCharge)$$

with NumDerCharge being the sequential order number of the last load placed on the given entrance level and NumCharge being the sequential order number of the selected load and with C1<C2<C0.

4. The method according to claim 1, wherein if the selection of a destination level is complete and if the following conditions are verified:
  the selected destination level is vacant;
  the sequential order number of the selected load is strictly greater than the sequential order number of the load in $(N.Y)^{th}$ place in a list of loads awaited at exit with Y being the load capacity of each entrance level; and
  either the at least one recirculation level is vacant or the last load placed on the at least one recirculation level has a sequential order number smaller than the sequential order number of the selected load;

then the selected destination level takes the status of a level of loads to be recirculated and the selected load takes the status of a load to be recirculated in order to be transferred to the entrance of the at least one recirculation level by the exit elevator.

5. The method according to claim 1, the buffer storage unit further comprising a "fast track" level vertically superimposed with the entrance levels and the at least one recirculation level, having a single entrance and a single exit, and comprising a "first-in-first-out" type conveyor according to the first sense,
  wherein, if one of the following conditions is met, the act of selecting a destination level comprises a selection of the "fast track" level:
  the sequential order number of the selected load is that of the next sequential number of the lists of loads awaited at exit;
  the sequential order number of the selected load is the one directly awaited after the sequential order number of the last load placed on the "fast track" level.

6. The method according to claim 1, wherein selecting a level of loads to be recirculated comprises:
  for each of the entrance levels, identifying the sequential order number of the load closest to the exit elevator; and
  selecting, as a level of loads to be recirculated, the entrance level for which the identified sequential order number is the highest.

7. The method according to claim 1, wherein, if the selection of a destination level is not completed, the iterative management of the entrance elevator comprises a test of the following two conditions:
  the at least one exit conveyor is saturated; and
  an exit elevator picking position is occupied by a load possessing the next sequential order number in the list of loads awaited at exit;
and wherein the act of selecting a level of loads to be recirculated is not carried out if the two conditions are verified, and if not it is carried out.

8. The method according to claim 1, wherein, if the selection of a destination level is not completed, the iterative management of the entrance elevator comprises a test of the following additional condition:
  a predetermined maximum number of level(s) to be recirculated is attained;
and the act of selecting a level of loads to be recirculated is not carried out if said additional condition is verified, and if not it is carried out.

9. The method according to claim 8, wherein the predetermined maximum number of level(s) of loads to be recirculated is equal to one.

10. A non-transitory computer-readable storage medium storing a computer program product comprising program code instructions, which when executed by a processor of a management unit configure the management unit to manage a buffer storage and load sequencing system, the system being configured to receive non-sequenced loads coming from at least one external unit, via at least one entrance conveyor, and to provide at least one sequence of loads in a given sequential order to at least one preparing station, through at least one exit conveyor, the system comprising:
  a buffer storage unit comprising N entrance levels and at least one recirculation level which are vertically superimposed, each having a single entrance and a single exit and each comprising a "first-in-first-out" type conveyor in a first sense for the entrance levels and in a second sense opposite the first sense for the at least one recirculation level, with N≥2, a load present on the at least one recirculation level being called a load in recirculation; and an entrance elevator and an exit elevator, of the reciprocating and discontinuous type, respectively positioned so as to be facing entrances and facing exits of the N entrance levels and of the at least one recirculation level;

wherein the program code instructions configure the management unit to carry out an iterative management of the entrance elevator comprising, at each iteration, the following acts:

if the entrance elevator is assigned a "waiting for recirculation" status, signifying that there exists at least one load to be recirculated in the system, the entrance elevator is put on hold until said at least one load to be recirculated has been transferred to the entrance of the at least one recirculation level;

if the entrance elevator is not assigned said "waiting for recirculation" status:

detecting a first load at an exit of the entrance conveyor and a second load at the exit of the at least one recirculation level;

selecting a load with the following rules: selecting the first load if there is no second load present or vice versa; if the first and second loads are present, selecting either routinely the second load or the load having the smallest sequential order number;

selecting a destination level from among the entrance levels in complying with a rule according to which loads present on a same entrance level, except for loads to be recirculated if any, are sequenced in a rising order of sequential order numbers;

if the selection of a destination level is completed, generating a task, for the entrance elevator, of transferring the selected load to the entrance of the selected destination level; if not:

assigning, to the entrance elevator, said "waiting for recirculation" status; and selecting a level of loads to be recirculated from among the entrance levels, without generating a task, for the entrance level, of transferring the selected load to the entrance of the selected level of loads to be recirculated, and assigning each load of the level of loads to be recirculated a status of a load to be recirculated signifying that said load must be transferred by the exit elevator to the entrance of the at least one recirculation level.

11. A management unit comprising:

a processor; and a non-transitory computer-readable storage medium comprising program code instructions stored thereon, which when executed by the processor configure the management unit to manage a buffer storage and load sequencing system, the system being configured to receive non-sequenced loads coming from at least one external unit, via at least one entrance conveyor, and to provide at least one sequence of loads in a given sequential order to at least one preparing station, through at least one exit conveyor, the system comprising:

a buffer storage unit comprising N entrance levels and at least one recirculation level which are vertically superimposed, each having a single entrance and a single exit and each comprising a "first-in-first-out" type conveyor in a first sense for the entrance levels and in a second sense opposite the first sense for the at least one recirculation level, with N≥2, a load present on the at least one recirculation level being called a load in recirculation; and an entrance elevator and an exit elevator, of the reciprocating and discontinuous type, respectively positioned so as to be facing entrances and facing exits of the N entrance levels and of the at least one recirculation level;

wherein the program code instructions configure the management unit to carry out an iterative management of the entrance elevator comprising, at each iteration, the following acts:

if the entrance elevator is assigned a "waiting for recirculation" status, signifying that there exists at least one load to be recirculated in the system, the entrance elevator is put on hold until said at least one load to be recirculated has been transferred to the entrance of the at least one recirculation level;

if the entrance elevator is not assigned said "waiting for recirculation" status:

detecting a first load at an exit of the entrance conveyor and a second load at the exit of the at least one recirculation level;

selecting a load with the following rules: selecting the first load if there is no second load present or vice versa; if the first and second loads are present, selecting either routinely the second load or the load having the smallest sequential order number;

selecting a destination level from among the entrance levels in complying with a rule according to which loads present on a same entrance level, except for loads to be recirculated if any, are sequenced in a rising order of sequential order numbers;

if the selection of a destination level is completed, generating a task, for the entrance elevator, of transferring the selected load to the entrance of the selected destination level; if not:

assigning, to the entrance elevator, said "waiting for recirculation" status; and selecting a level of loads to be recirculated from among the entrance levels, without generating a task, for the entrance level, of transferring the selected load to the entrance of the selected level of loads to be recirculated, and assigning each load of the level of loads to be recirculated a status of a load to be recirculated signifying that said load must be transferred by the exit elevator to the entrance of the at least one recirculation level.

* * * * *